US010928212B2

(12) United States Patent
Gopinath et al.

(10) Patent No.: US 10,928,212 B2
(45) Date of Patent: *Feb. 23, 2021

(54) PROVIDING ONLINE MAPPING WITH USER SELECTED PREFERENCES

(71) Applicant: International Business Machines Corporation, Armonk, NY (US)

(72) Inventors: Divya Gopinath, Clarksburg, MD (US); Rajesh Radhakrishnan, Reston, VA (US); Jennifer A. Watson, Wasaga Beach (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/391,465

(22) Filed: Apr. 23, 2019

(65) Prior Publication Data

US 2019/0250005 A1 Aug. 15, 2019

Related U.S. Application Data

(63) Continuation of application No. 15/153,000, filed on May 12, 2016, now Pat. No. 10,352,713, which is a (Continued)

(51) Int. Cl.
*G01C 21/34* (2006.01)
*H04L 29/08* (2006.01)
*G01C 21/36* (2006.01)

(52) U.S. Cl.
CPC ..... *G01C 21/3484* (2013.01); *G01C 21/3682* (2013.01); *H04L 67/306* (2013.01)

(58) Field of Classification Search
CPC .......... G01C 21/3484; G01C 21/3682; H04L 67/306
See application file for complete search history.

(56) References Cited

U.S. PATENT DOCUMENTS 7,676,376 B2 3/2010 Colman
7,777,648 B2 8/2010 Smith et al.
(Continued)

FOREIGN PATENT DOCUMENTS

WO WO2011116505 9/2011
WO WO-2011116505 A1 * 9/2011 ........... G06Q 10/109

OTHER PUBLICATIONS

Method of Integrating Profile-based Add-on Services for Generating Driving Directions, IP.com, IPCOM000159808D, Oct. 29, 2007, 3 pages.
(Continued)

*Primary Examiner* — John T Repsher, III
(74) *Attorney, Agent, or Firm* — Schmeiser, Olsen & Watts, LLP; Michael A. Petrocelli

(57) ABSTRACT

A method and system. It is ascertained that user preferences of a user for service providers of specified features relating to the one or more travel routes are not contained in a user preference database and that the user preferences of the user for service providers of the specified features have not been provided with a previously received request to generate for the user a geographical map that depicts one or more travel routes from a specified initial address to a specified destination address, the specified features, and unique identifiers of preferred service providers of the specified features. User preferences of the user for service providers of the specified features are determined and in response, the map is generated and displayed.

20 Claims, 6 Drawing Sheets

Related U.S. Application Data continuation of application No. 13/665,212, filed on Oct. 31, 2012, now Pat. No. 9,383,216.

(56) References Cited

U.S. PATENT DOCUMENTS

| | | | |
|---|---|---|---|
| 8,108,501 B2 | 1/2012 | Birnie et al. | |
| 9,383,216 B2 | 7/2016 | Gopinath et al. | |
| 2003/0158655 A1* | 8/2003 | Obradovich | G01C 21/3461 701/468 |
| 2005/0187707 A1* | 8/2005 | Yokota | G01C 21/3476 701/410 |
| 2006/0271277 A1 | 11/2006 | Hu et al. | |
| 2007/0210937 A1 | 9/2007 | Smith et al. | |
| 2008/0068380 A1 | 3/2008 | McAvoy et al. | |
| 2008/0104227 A1 | 5/2008 | Birnie et al. | |
| 2008/0255977 A1 | 10/2008 | Altberg et al. | |
| 2009/0132504 A1 | 5/2009 | Vegnaduzzo et al. | |
| 2009/0254840 A1 | 10/2009 | Churchill et al. | |
| 2010/0082242 A1 | 4/2010 | Park | |
| 2010/0121566 A1 | 5/2010 | Joshi et al. | |
| 2010/0287033 A1 | 11/2010 | Mathur | |
| 2010/0305842 A1 | 12/2010 | Feng | |
| 2011/0046876 A1 | 2/2011 | Pan et al. | |
| 2011/0246496 A1 | 10/2011 | Chung | |
| 2011/0282857 A1 | 11/2011 | Bennett | |
| 2011/0302203 A1 | 12/2011 | Tracy et al. | |
| 2012/0041672 A1* | 2/2012 | Curtis | H04W 4/029 701/426 |
| 2012/0078754 A1 | 3/2012 | Wiseman et al. | |
| 2013/0138343 A1 | 5/2013 | Choi | |
| 2013/0339891 A1 | 12/2013 | Blumenberg et al. | |
| 2014/0067540 A1 | 3/2014 | Williams et al. | |
| 2014/0074395 A1 | 3/2014 | Brown | |
| 2014/0123017 A1 | 5/2014 | Gopinath et al. | |
| 2016/0258771 A1 | 9/2016 | Gopinath et al. | |

OTHER PUBLICATIONS

Anywhere in the world, foursquare Explore can find you something interesting (now on your computer!), foursquare, dated Jan. 12, 2012, 18 pages, Retrieved Jul. 17, 2012 from http://blog.foursquare.com/2012/01/12/anywhere-in-the-world-foursquare-explore-can-find-you-something-interesting-now-on-your-computer/.
Office Action (dated Aug. 15, 2014) for U.S. Appl. No. 13/665,212, filed Oct. 31, 2012, Conf. No. 9653.
Amendment (dated Nov. 14, 2014) for U.S. Appl. No. 13/665,212, filed Oct. 31, 2012, Conf. No. 9653.
Final Office Action (dated Apr. 13, 2015) for U.S. Appl. No. 13/665,212, filed Oct. 31, 2012, Conf. No. 9653.
RCE (Jul. 13, 2015) for U.S. Appl. No. 13/665,212, filed Oct. 31, 2012, Conf. No. 9653.
Notice of Allowance (dated Apr. 5, 2016) for U.S. Appl. No. 13/665,212, filed Oct. 31, 2012, Conf. No. 9653.
Final Amendment (dated Jun. 15, 2015) for U.S. Appl. No. 13/665,212, filed Oct. 31, 2012, Conf. No. 9653.
Advisory Action (dated Jul. 9, 2015) for U.S. Appl. No. 13/665,212, filed Oct. 31, 2012, Conf. No. 9653.
Office Action (dated Oct. 23, 2018) for U.S. Appl. No. 15/153,000, filed May 12, 2016.
Amendment (dated Jan. 23, 2019) for U.S. Appl. No. 15/153,000, filed May 12, 2016.
Notice of Allowance (dated Mar. 7, 2019) for U.S. Appl. No. 15/153,000, filed May 12, 2016.

* cited by examiner

PROVIDING ONLINE MAPPING WITH USER SELECTED PREFERENCES

This application is a continuation application claiming priority to Ser. No. 15/153,000, filed May 12, 2016, now U.S. Pat. No. 10,352,713, issued Jul. 16, 2019, which is a continuation application of Ser. No. 13/665,212, filed Oct. 31, 2012, now U.S. Pat. No. 9,383,216, issued Jul. 5, 2016.

BACKGROUND

1. Field

The invention disclosed and claimed herein generally pertains to online mapping services. More particularly, the invention pertains to adapting an online mapping service or mapping tool to furnish and display information with the map that pertains to preferences and special interests of the user.

2. Description of the Related Art

At present, Global Positioning Systems (GPS) and online mapping services or systems such as Google maps, are used to provide directions to locations, travel distance information, and various types of information pertaining to a specified geographical location. For example, if a person plans to travel to a remote city for several days and stay at a particular address, he or she can use an online mapping service to locate places of interest, such as various types of businesses and public facilities that are within a specified distance from the particular address, By way of example and not limitation, places of interest could include hotels, movie theaters, public libraries, and restaurants or other businesses of particular types.

Notwithstanding the benefits of currently available mapping systems, their use has certain drawbacks. As an example, a user living in a large city such as New York could have a special interest in a certain type of vintage records. In order to search for records of the particular type, he enters a search request for "New York record stores" in an online mapping service of the above type. In response, the service provides the user with over 15,000 results. While each of these results is a New York record store, there is no further information to indicate which of the stores may contain the particular records of interest, and which do not. Accordingly, the user is required to expend further effort, which may be substantial, to determine this information for individual stores.

SUMMARY

Embodiments of the invention pertain to a method, system and computer program product, wherein an online mapping service or other mapping tool is configured to provide faceted search results, and to provide multiple displays of the results. In these embodiments, an online mapping tool or service can access user preferences, and can also access preferences of others who are associated with the user through one or more social networks. In response to a user request for location, travel distance or other geographic information that the mapping tool generally provides, the mapping tool accesses one or more of the social networks, in order to determine certain user preferences. The mapping tool then presents the user with a viewable map showing location or other requested information, which has been modified or highlighted in accordance with the preference information.

One embodiment of the invention is directed to a computer implemented method for operating a viewable mapping tool to provide a user with specified information including information pertaining to one or more preferred service providers. The method includes the step of responsive to receiving a map request from a user that pertains to a specified geographical feature, generating a first view that shows the geographical feature. The method further includes specifying each of one or more preference categories of the user, wherein a user preference is needed for each category, in order to show an additional feature corresponding to each user preference on a map view which includes the geographical feature. The method further includes determining the user preference for each category, wherein at least one of the user preferences is determined from information obtained by accessing an online social network in which the user participates. Each determined user preference is used with one or more search engines in order to acquire information for use in generating each of the additional features for a map view.

DETAILED DESCRIPTION

Figure 1:
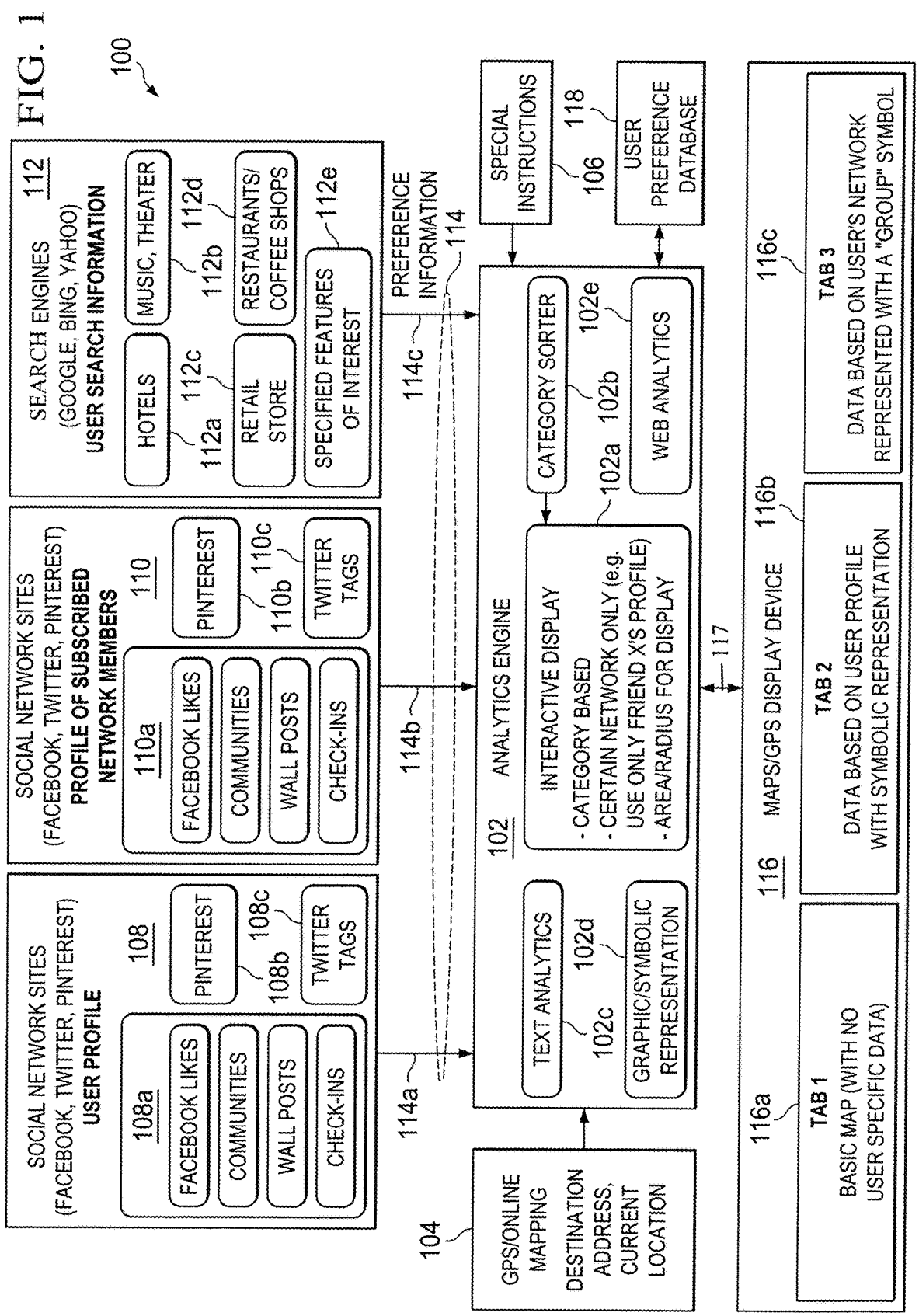
FIG. 1 is a schematic view depicting components for an embodiment of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system," Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring to FIG. 1, there is shown a mapping tool including a processing system 100 for implementing embodiments of the invention. System 100 includes an analytics engine 102 that contains modules 102a-102e. Analytics Engine 102 is configured to perform certain functions of a GPS or online mapping service in response to a user map request, in order to provide a map for the user that shows specified geographic information. Such information, for example, could include one or more travel routes from a current location to a destination address, or could show an area lying within a selected radius of the destination address. Accordingly, system 100 is provided with an input device 104 for furnishing engine 102 with such address and location information.

FIG. 1 further shows a user input device 106 for entering special instructions into analytics engine 102, in connection with a particular map request. Such special instructions are discussed hereinafter in further detail.

Referring further to FIG. 1, there are shown social network sites 108 and 110 connected to analytics engine 102 through a preference information channel 114, and more particularly through channel components 114a and 114b, respectively. Networks 108 and 110 may have servers that each has a Web 2.0 interface. Also, one or more search engines 112 are connected to analytics engine 102, through a channel component 114c.

Embodiments of the invention may use one or more social network sites 108, such as Facebook, Twitter and/or Pinterest, by way of example and not limitation, wherein a network 108 provides a profile of a user of system 100. Thus, a network 108 can furnish a list of the preferences, or likes and dislikes, of a user who is registered therewith. For example, social network site 108a includes elements found in Facebook and networks similar thereto, such as user likes or preferences; communities or groups that include the user; and wall posts and check-ins. The Pinterest site 108b provides user preferences for things and places that are shown by pictures. Twitter tags 108c enable a user to comment on different subjects that are respectively represented by tags.

Social network sites 110 are similar to sites 108, except that each site 110 provides profiles of members of a group who are associated with the user, rather than a profile of the user. Network sites 110a-c are similar or identical to network sites 108a-c, respectively.

FIG. 1 further shows a Maps or GPS display device 116 connected to analytics engine 102. Display device 116 is capable of providing multiple displays, or multiple facets, 116a-116c. These are associated with Tabs 1-3, respectively, as described hereinafter in further detail. Display device 116 is connected to analytics engine 102 by means of a link 117, and is controlled and operated by interactive display module 102a of analytics engine 102.

In the operation of system 100, a user may initially provide certain preference information, which is stored in a user preference database 118. This information could pertain to preferences in regard to categories such as hotels, types of restaurants, preferred service providers of other types, entertainment preferences and special interests, but is by no means limited thereto. To begin operation of system 100, the user initially requests a map for some purpose, by using input device 104 and providing information associated therewith. Analytics engine 102 then defines a search for information related to the map request, and determines categories that are to be searched. For example, in one embodiment of the invention, analytics engine 102 would be configured to understand that whenever it receives a request for a travel route to a particular destination address, it is to search for hotels, restaurants and other specified features and preferred service providers in the vicinity of that address. In another embodiment, one or more features to be searched for could be provided by the user as special instructions, using input device 106.

After initially determining categories of interest, analytics engine 102 queries the contents of database 118, to determine whether there is a user preference specified in such database for each category of interest. If there is a preference for a category, that preference may be selected. However, if there is no preference in the database for a given category, analytics engine 102 queries social network sites 108, in order to acquire data indicating user preferences for that category. In addition, analytics engine 102 queries social network sites 110, to determine preferences of others who are in a group or community with the user. In some embodiments of the invention, the user could specify one or more other persons, such as Friend X, whose profile is to be considered when determining the user's preferences for a particular category. This information is then provided to module 102a of analytics engine 102. For security reasons, only members of the social network who are registered with this service of system 100, and who have been allowed to capture the user's preferences, would be used for this purpose.

After reaching conclusions about user preferences in regard to respective categories of interest, search engine 102 directs corresponding search requirements to the analytics engines 112. FIG. 1 shows representative categories that can be searched by engines 112 in accordance with the user's preferences, including hotels 112a; music and theater establishments 112b; retail stores 112c; and restaurants and coffee shops 112d. A generic set of categories 112e is also included, to search for special features or interests that a user may specify.

Referring further to FIG. 1, there is shown analytics engine 102 configured to carry out respective tasks as described above. Module 102e is a web analytics module, which communicates with and analyzes results from the servers of a network interface, such as Web 2.0 servers. Module 102b is a category sorter, which arranges items of a category according to preferences. Thus, module 102b sorts or filters out less desired items. Text analytics module 102c processes results from respective searches, by converting text from the searches into lexicography understood by analytics engine 102.

Graphic/symbolic representation module 102b is used to generate symbols representing different features on a map produced and displayed by system 100, in response to the initial user request.

Usefully, three different maps may be produced for display by device 116. Display 116a shows only the requested map, without any information pertaining to user preferences or profile data. Display 116b shows the requested map, together with user profile data or preferences. Display 116c shows the information of map 116b, and additionally shows information that has been derived from preferences of one or more members of the user's social network group. Such information may be represented by a special symbol. Also, displays 116a-116c are usefully selected by clicking on Tabs 1-3 respectively.

To further illustrate operation and features of system 100, an example is considered wherein a user intends to drive from a given city in Pennsylvania to Washington D. C. The purpose of this travel is to conduct business at a particular location in the Washington area, over a three-day period. Accordingly, the user enters a request for a map, such as a Google map, by means of input device 104. The user inputs his location in the given city, and also the address of the intended location in the Washington area.

Along with the map request, the user makes use of input device 106 to enter certain special instructions, to which system 100 is configured to respond. These instructions include a request for the map to show certain user preferred service providers, such as all XXX brand hotels that are within a 5 mile radius of the destination address. Other special instructions could be for the map to show all seafood restaurants, and all music stores that sell vintage records, which are also within the 5 mile radius.

In this example, system 100 is preconfigured to respond to the above map request by providing a map that shows all hotels of a user preferred hotel chain that are within 5 miles of the destination address. The map must also show all gas stations of a user preferred type that lie along the route of travel. Accordingly, in response to the map request, analytics engine 102 first queries database 118, in order to obtain information pertaining to user preferences.

In regard to user hotel preferences, analytics engine 102 determines from user profile data in database 118 that in the past, the user has had a preference for hotels of the YYY hotel chain. However, in the special instructions the user explicitly states a preference for hotels of the XXX chain, not YYY hotels. Accordingly, the user's hotel preference is updated in database 118 to show this explicit preference. When the map is produced, it will include all XXX hotels within 5 miles of the destination address.

In regard to preferred service providers pertaining to driving needs, such as gas stations, analytics engine 102 examines user profile data in database 118, but is not able to find an explicit user preference for a particular brand of gas station. Accordingly, analytics engine 102 proceeds to query social network sites 108 and 110, in order to obtain further information pertaining to user preferences. In examining a social network group that includes the user, analytics engine 102 finds recent communications between the user and group friends that pertain to gas stations. In these communications, the user repeatedly states that he has found ZZZ brand gas stations to have more favorable prices than other brands, and to be clean and well run. Analytics engine 102 interprets these comments of user to indicate an implicit preference for ZZZ brand, as his service provider for gas stations. Locations of these stations are then shown on a map produced in response to the map request.

In response to the special instruction to show music stores that sell vintage records, analytics engine 102 finds no preference information in database 118. Analytics Engine 102 thus communicates with search engine 112, to obtain a list of all such stores that are within 5 miles of the destination address. In addition, analytics engine 102 determines from information provided by the profile of the user's Friend X that Friend X has been successful in finding vintage records in ABC music stores. One of the music stores found to be within 5 miles of the destination address is an ABC music store. Moreover, the user and Friend X are shown to have the same likes in regard to vintage records. This information is provided to the user, in connection with the map produced in response to the map request. Usefidly, a special symbol or marking is used to indicate the ABC music store. Also, this information is used to update user preference data in database 118.

Responsive to the special instruction to show seafood restaurants, analytics engine 102 uses search engines 112 to obtain a list of these restaurants within 5 miles of the destination address. Also, profiles of both the user and Friend X show that both of them particularly enjoy soft shell crabs. Accordingly, restaurants on the list that include this as a specialty are displayed on the map with a special symbol or marking.

Figure 2:
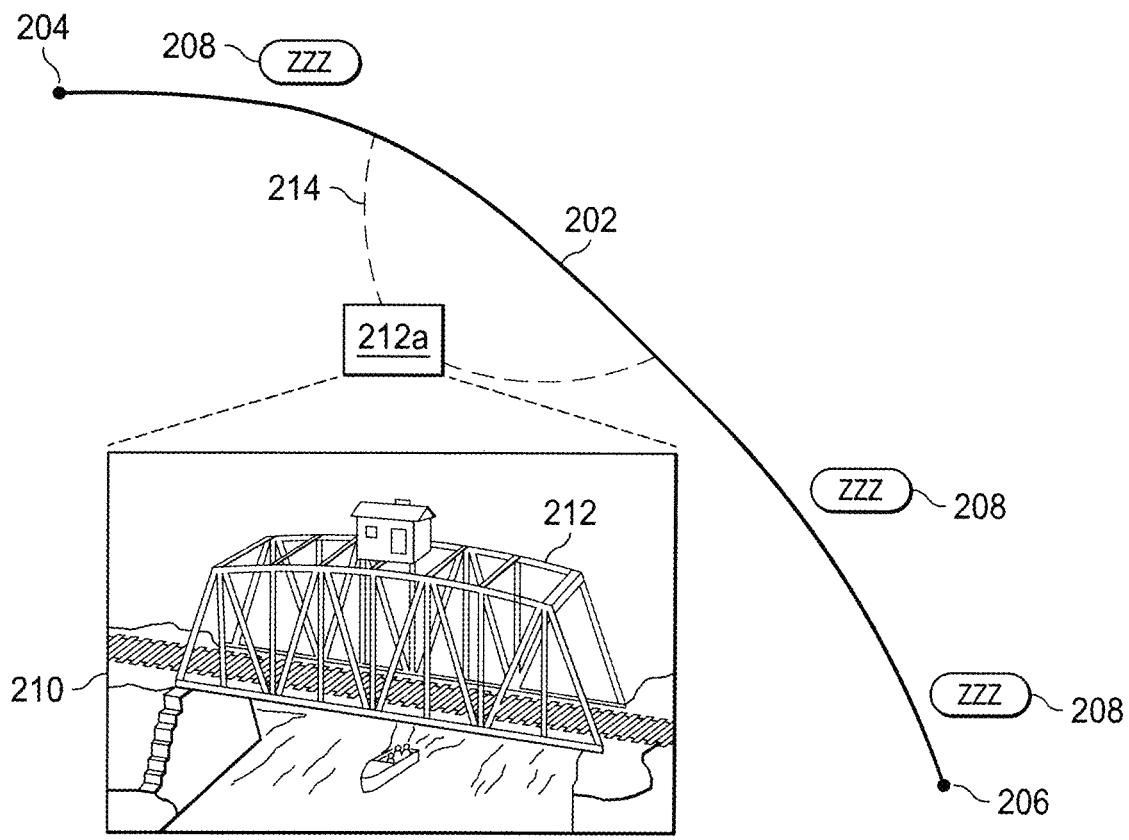
FIG. 2 is a schematic view showing elements of a map generated by an embodiment of the invention.

Referring to FIG. 2, there is shown a map depicting a route of travel 202, which has been prepared by system 100 as described above. Route 202 thus extends from an initial user location address 204 to destination address 206. FIG. 2 also shows locations 208 of ZZZ gas stations along route 202, which were determined to be the preferred service provider of the user for gas station services as described above. These locations may be indicated by a symbol that is used uniquely to represent only ZZZ gas stations on the map of FIG. 2.

As a useful feature of an embodiment of the invention, system 100 of FIG. 1 determines from information provided by social networks 108 and 110 that the system user highly appreciates historic and picturesque railroad bridges. Moreover, the user has expressed great interest in a picture 210, such as through Pinterest or the like, that shows a particular historic railroad bridge 212. System 100 further recognizes that this bridge, represented on the map of FIG. 2 as symbol 212a, is very close to travel route 202, and could be accessed by a detour route 214.

In view of these conclusions, system 100 shows both symbol 212a and detour route 214 on the map produced in response to the user request. The map is accompanied by a clear notification to the user, which explains what these elements are. The notification would also provide an estimate of the change in travel time the user could expect, if he took detour route 214. It is anticipated that this feature could be implemented by software included in analytics engine 102 of system 100, and could be activated by the user as an option.

Figure 3A:
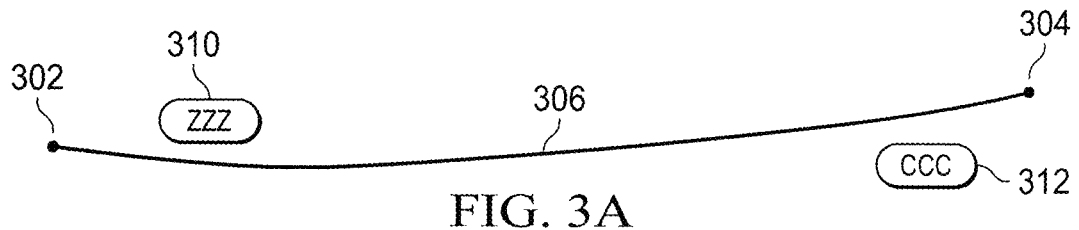
FIGS. 3A and 3B are schematic views showing different facets generated by an embodiment of the invention.
Figure 3B:
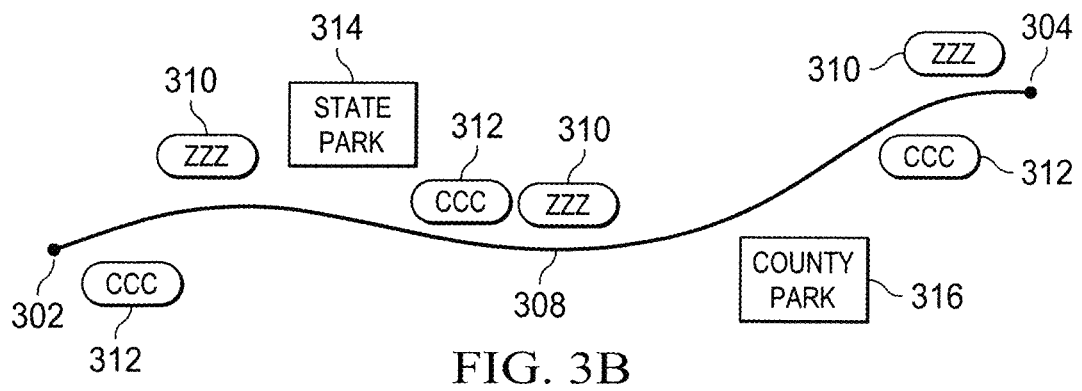

FIGS. 3A and 3B show multiple facets or displays that may be provided by an embodiment of the invention. More particularly, FIGS. 3A and 3B show maps depicting different routes from an initial user location 302 to a destination address 304. Both of these maps or facets are presented to the user in response to a user map request. FIG. 3A shows a route 306 and FIG. 3B shows a route 308.

The facets of FIGS. 3A and 3B also show preferred service providers of the user that are located along their respective routes. Thus, FIG. 3A shows a ZZZ gas station 310 along its route 306. Also, it has been determined that CCC coffee shops are preferred by the user. FIG. 3A therefore shows one of such service providers 312 along route 306.

Referring further to FIG. 3B, it is seen that multiple ZZZ gas station 310 and multiple CCC coffee shops 312 are located along route 308. Moreover, a system such as system 100 has previously determined that a user's preference when traveling is to stop in public parks, in order to stretch his legs. Two providers of park services, a state park 314 and a county park 316, are both located along route 308 and are therefore shown in the map of FIG. 3B.

By providing the user with different facets for a given map search, the user is provided with options. For example, the user could decide to select route 308 for travel, even if route 306 was shorter, since route 308 shows significantly more user preferred service providers than route 306.

Figure 4:
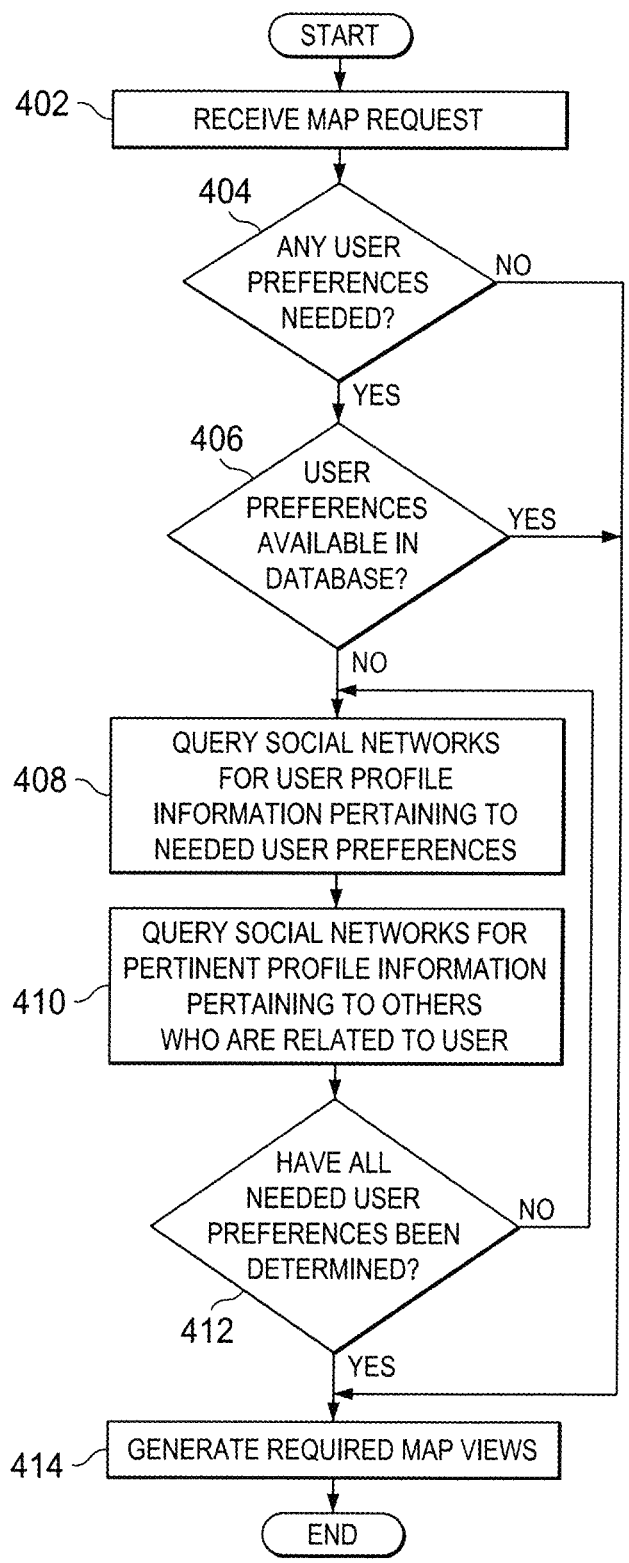
FIG. 4 is a flowchart showing steps for a method including an embodiment of the invention.

Referring to FIG. 4, there are shown steps for a method including an embodiment of the invention. At step 402, a request is received for a map, such as a GPS or online service map of some type. The request could be for a map showing a geographical feature such as a travel route, or the area around a specified destination address. In response to the map request, a mapping tool such as system 100 of FIG. 1 could define or set up a map view showing the geographical feature.

At decision step 404, the method determines whether any preferences of the user are needed, for features which are to be shown on the requested map. This could include preferences for hotels, gas stations and the like, as described above. If the decision at step 404 is negative, the method proceeds to step 414, and otherwise goes to decision step 406.

Step 406 determines whether or not all needed user preferences for the requested map are already available. For example, all needed references could already be contained in database 118 of system 100, or could be provided explicitly by the user along with the map request. If the result of step 406 is positive, the method goes to step 414, and otherwise goes to step 408.

At step 408, social networks such as network sites 108 are queried, to acquire user profile information for use in determining needed preferences. At step 410, social networks such as sites 110 are queried. As described above, these sites can provide profile information of persons who were related or connected to a user in a social network, and who had certain likes or preferences in common with the user.

Step 412 decides whether or not all needed user preferences have been determined. If not, the method loops back to step 408, and otherwise the method proceeds to step 414. At this step, all required map views are generated for display, such as displays 116a-116c of FIG. 1. The method then ends.

Figure 5:
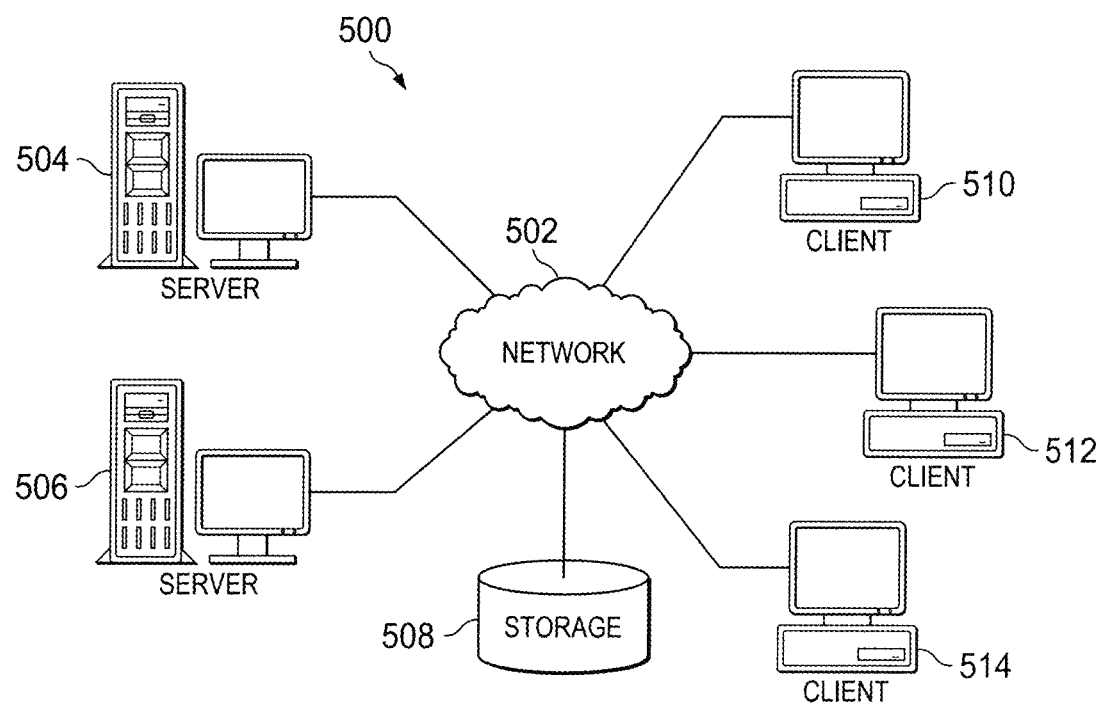
FIG. 5 is a block diagram showing a network of data processing systems in which an embodiment of the invention may be implemented.

FIG. 5 is a pictorial representation of a network of data processing systems in which illustrative embodiments of the invention may be implemented, Network data processing system 500 is a network of computers in which the illustrative embodiments may be implemented. Network data processing system 500 contains network 502, which is the medium used to provide communications links between various devices and computers connected together within network data processing system 500. Network 502 may include connections, such as wire, wireless communication links, or fiber optic cables.

In the depicted example, server computer 504 and server computer 506 connect to network 502 along with storage unit 508. In addition, client computers 510, 512, and 514 connect to network 502. Client computers 510, 512, and 514 may be, for example, personal computers or network computers. In the depicted example, server computer 504 provides information, such as boot files, operating system images, and applications to client computers 510, 512, and 514. Client computers 510, 512, and 514 are clients to server computer 504 in this example. Network data processing system 500 may include additional server computers, client computers, and other devices not shown.

Program code located in network data processing system 500 may be stored on a computer-recordable storage medium and downloaded to a data processing system or other device for use. For example, program code may be stored on a computer-recordable storage medium on server computer 504 and downloaded to client computer 510 over network 502 for use on client computer 510.

In the depicted example, network data processing system 500 is the Internet with network 502 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational and other computer systems that route data and messages. Of course, network data processing system 500 also may be implemented as a number of different types of networks, such as, for example, an intranet, a local area network (LAN), or a wide area network (WAN). FIG. 5 is intended as an example, and not as an architectural limitation for the different illustrative embodiments.

Figure 6:
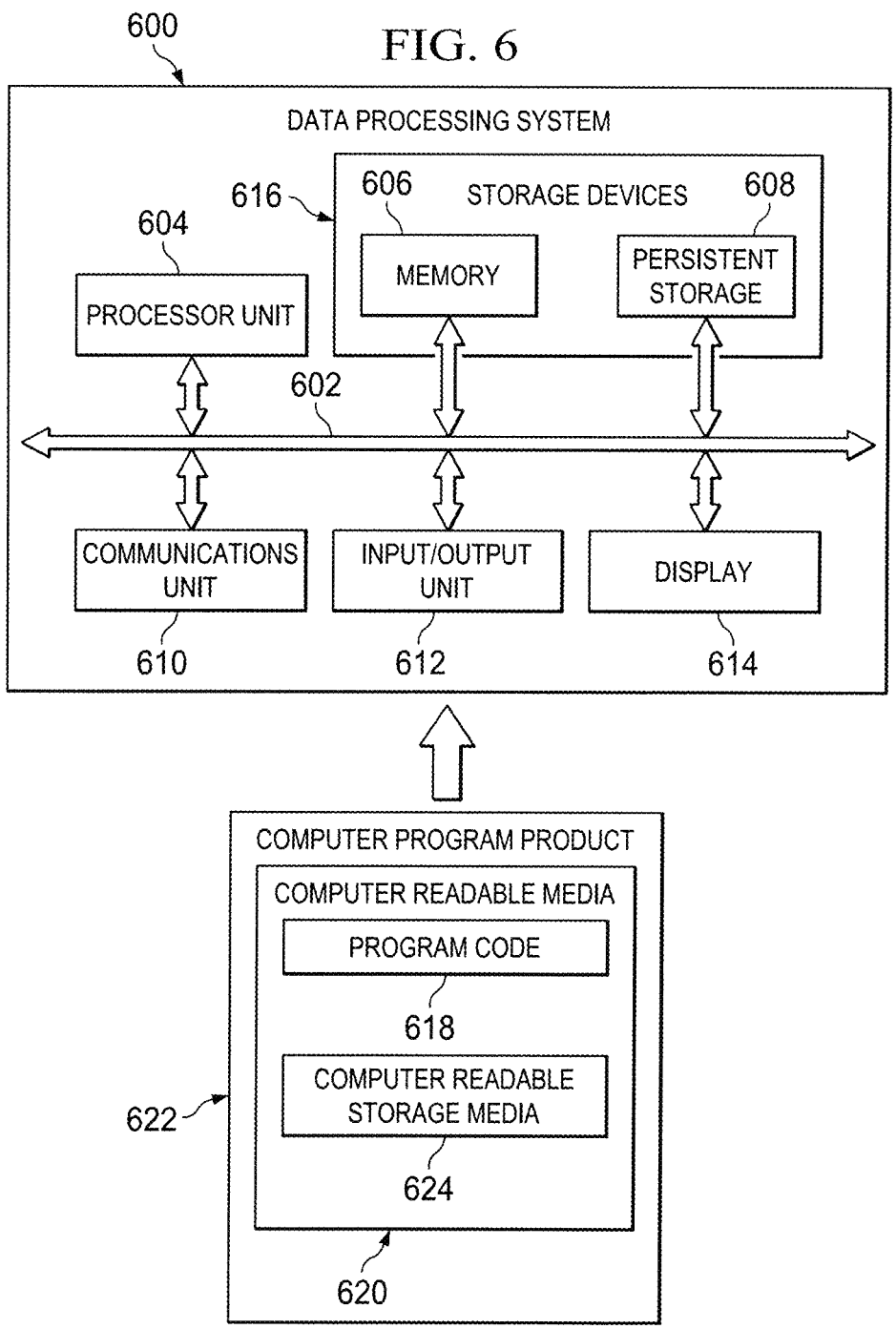
FIG. 6 is a block diagram showing a computer or data processing system that may be used in implementing embodiments of the invention.

Turning now to FIG. 6, an illustration of a data processing system is depicted in accordance with an illustrative embodiment. The data processing system may be used as one or more of the components for network system 500. In this illustrative example, data processing system 600 includes communications fabric 602, which provides communications between processor unit 604, memory 606, persistent storage 608, communications unit 610, input/output (I/O) unit 612, and display 614.

Processor unit 604 serves to execute instructions for software that may be loaded into memory 606. Processor unit 604 may be a number of processors, a multi-processor core, or some other type of processor, depending on the particular implementation. A number, as used herein with reference to an item, means one or more items. Further, processor unit 604 may be implemented using a number of heterogeneous processor systems in which a main processor is present with secondary processors on a single chip. As another illustrative example, processor unit 604 may be a symmetric multi-processor system containing multiple processors of the same type.

Memory 606 and persistent storage 608 are examples of storage devices 616. A storage device is any piece of hardware that is capable of storing information, such as, for example, without limitation, data, program code in functional form, and/or other suitable information either on a temporary basis and/or a permanent basis. Storage devices 616 may also be referred to as computer-readable storage devices in these examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these examples, provides for communications with other data processing systems or devices. In these examples, communications unit 710 is a network interface card. Communications unit 610 may provide communications through the use of either or both physical and wireless communications links.

Input/output unit 612 allows for input and output of data with other devices that may be connected to data processing system 600. For example, input/output unit 612 may provide a connection for user input through a keyboard, a mouse, and/or some other suitable input device. Further, input/output unit 612 may send output to a printer. Display 614 provides a mechanism to display information to a user.

Instructions for the operating system, applications, and/or programs may be located in storage devices 616, which are in communication with processor unit 604 through communications fabric 602, In these illustrative examples, the instructions are in a functional form on persistent storage 608. These instructions may be loaded into memory 606 for execution by processor unit 604. The processes of the different embodiments may be performed by processor unit 604 using computer implemented instructions, which may be located in a memory, such as memory 606.

These instructions are referred to as program code, computer-usable program code, or computer-readable program code that may be read and executed by a processor in processor unit 604. The program code in the different embodiments may be embodied on different physical or computer-readable storage media, such as memory 606 or persistent storage 608.

Program code 618 is located in a functional form on computer-readable media 620 that is selectively removable and may be loaded onto or transferred to data processing system 600 for execution by processor unit 604. Program code 618 and computer-readable media 620 form computer program product 622 in these examples. In one example, computer-readable media 620 may be computer-readable storage media 624. Computer-readable storage media 624 may include, for example, an optical or magnetic disk that is inserted or placed into a drive or other device that is part of persistent storage 608 for transfer onto a storage device, such as a hard drive, that is part of persistent storage 608. Computer-readable storage media 624 also may take the form of a persistent storage, such as a hard drive, a thumb drive, or a flash memory, that is connected to data processing system 600. In some instances, computer-readable storage media 624 may not be removable from data processing system 600.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown. The different embodiments may be implemented using any hardware device or system capable of running program code. As one example, the data processing system may include organic components integrated with inorganic components and/or may include entirely organic components excluding a human being. For example, a storage device may be comprised of an organic semiconductor.

In another illustrative example, processor unit 604 may take the form of a hardware unit that has circuits that are manufactured or configured for a particular use. This type of hardware may perform operations without needing program code to be loaded into a memory from a storage device to be configured to perform the operations.

For example, when processor unit 604 takes the form of a hardware unit, processor unit 604 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 618 may be omitted because the processes for the different embodiments are implemented in a hardware unit.

In still another illustrative example, processor unit 604 may be implemented using a combination of processors found in computers and hardware units. Processor unit 604 may have a number of hardware units and a number of processors that are configured to run program code 618. With this depicted example, some of the processes may be implemented in the number of hardware units, while other processes may be implemented in the number of processors.

As another example, a storage device in data processing system 600 is any hardware apparatus that may store data. Memory 606, persistent storage 608, and computer-readable media 620 are examples of storage devices in a tangible form.

In another example, a bus system may be used to implement communications fabric 602 and may include one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 606, or a cache, such as found in an interface and memory controller hub that may be present in communications fabric 602.

Figure 7:
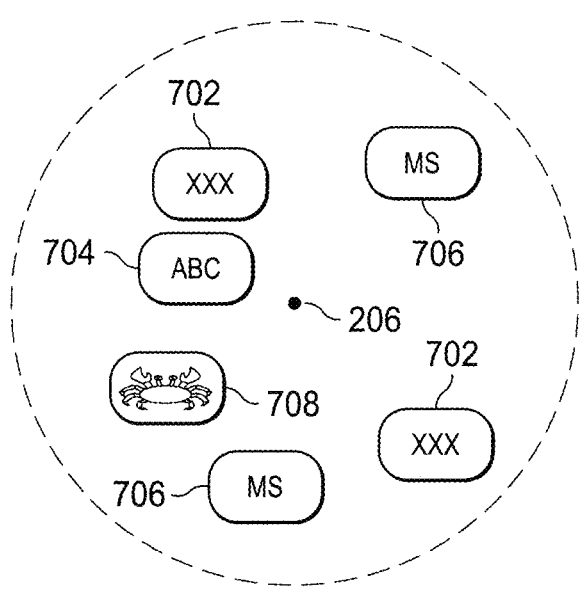
FIG. 7 is a schematic view showing further elements of a map generated by an embodiment of the invention.

FIG. 7 shows a mapping of user preferred service providers that are within a specified radius of destination address 206, such as 5 miles. Different types of providers in the map of FIG. 7 are uniquely represented by different symbols. Thus, each symbol 702 represents an XXX hotel, symbol 704 represents an ABC music store, and symbols 706 represent other music stores. Symbol 708 represents a seafood restaurant that has soft shell crabs as a specialty.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, said method comprising:

ascertaining, by a processor of a computer system that comprises a user preference database specifying user preferences of users for service providers of different features, that user preferences of a user for service providers of specified features are not contained in the user preference database and that the user preferences of the user for service providers of the specified features have not been provided with a previously received request to generate for the user a geographical map that depicts one or more travel routes from a specified initial address to a specified destination address, specified features relating to the one or more travel routes, and unique identifiers of preferred service providers of the specified features;

in response to said ascertaining, said processor determining user preferences of the user for service providers of the specified features;

in response to said determining user preferences of the user for service providers of the specified features, said processor generating the map that depicts the one or more travel routes, the specified features, and the unique identifiers of the preferred service providers of the specified features, wherein the unique identifiers of the preferred service providers of the specified features are placed at locations, along the one or more travel routes, wherein a first preferred service provider of the preferred service providers is depicted on the map as appearing at a first, second, and third location on the map, wherein the first and second locations are on a first side of one travel route of the one or more travel routes, wherein the third location is on a second, opposite side of the one travel route, wherein the unique identifier of a second preferred service provider of the preferred service providers is depicted on the map as appearing at a fourth, fifth, and sixth location on the map, and wherein the fourth, fifth, and sixth locations are on the second, opposite side of the one travel route; and said processor displaying, by a display device of the computer system, the generated map.

2. The method of claim 1, wherein said determining the user preferences of the user for service providers of the specified features comprises:

determining, from a profile of the user in a first online social network of the one or more online social networks, a user preference of the user for the first preferred service provider of a first feature of the specified features, wherein the user is registered with the first online social network; and determining, from a profile of a member of a second online social network of the one or more online social networks, a user preference of the user for the second preferred service provider of a second feature of the specified features, wherein the member of the second online social network is associated with the user.

3. The method of claim 1, said method further comprising: prior to said generating the map, said processor determining, from the one or more online social network sites, an interest by the user in a picture that shows a historic site, wherein the map depicts a detour route emerging from and returning to a first travel route of the at least one travel route and depicts the historic site along the detour route.

4. The method of claim 3, wherein the detour route replaces a segment of the first travel route to define a new travel route consisting of the first travel route incremented by the detour route and decremented by the replaced segment, and wherein the method further comprises:
said processor communicating to the user an estimate of a change in expected travel time in traveling the new travel route, as compared with traveling the first travel route, from the specified initial address to the specified destination address.

5. The method of claim 1, wherein said determining the user preferences of the user for service providers of the specified features comprises determining a user preference of a first service provider of a first feature of the specified features, and wherein the map depicts the first feature and the first service provider distributed along each travel route the one or more travel routes.

6. The method of claim 5, wherein the map depicts at least two instances of the first feature and of the first service provider distributed along a first travel route of the one or more travel routes.

7. The method of claim 6, wherein the one or more travel routes is a plurality of travel routes.

8. The method of claim 1, wherein a first and second public park are depicted on the map as appearing at a seventh and eighth location on the first and second side of the one travel route, respectively.

9. A computer program product, comprising a computer readable persistent storage device having computer readable program code stored therein, said program code containing instructions which, upon being executed by a processor of a computer system that comprises a user preference database specifying user preferences of users for service providers of different features, implement a method, said method comprising:
said processor ascertaining that user preferences of a user for service providers of specified features are not contained in the user preference database and that the user preferences of the user for service providers of the specified features have not been provided with a previously received request to generate for the user a geographical map that depicts one or more travel routes from a specified initial address to a specified destination address, specified features relating to the one or more travel routes, and unique identifiers of preferred service providers of the specified features;
in response to said ascertaining, said processor determining user preferences of the user for service providers of the specified features;
in response to said determining user preferences of the user for service providers of the specified features, said processor generating the map that depicts the one or more travel routes, the specified features, and the unique identifiers of the preferred service providers of the specified features, wherein the unique identifiers of the preferred service providers of the specified features are placed at locations, along the one or more travel routes, wherein a first preferred service provider of the preferred service providers is depicted on the map as appearing at a first, second, and third location on the map, wherein the first and second locations are on a first side of one travel route of the one or more travel routes, wherein the third location is on a second, opposite side of the one travel route, wherein the unique identifier of a second preferred service provider of the preferred service providers is depicted on the map as appearing at a fourth, fifth, and sixth location on the map, and wherein the fourth, fifth, and sixth locations are on the second, opposite side of the one travel route; and
said processor displaying, by a display device of the computer system, the generated map.

10. The computer program product of claim 9, wherein said determining the user preferences of the user for service providers of the specified features comprises:
determining, from a profile of the user in a first online social network of the one or more online social networks, a user preference of the user for the first preferred service provider of a first feature of the specified features, wherein the user is registered with the first online social network; and
determining, from a profile of a member of a second online social network of the one or more online social networks, a user preference of the user for the second preferred service provider of a second feature of the specified features, wherein the member of the second online social network is associated with the user.

11. The computer program product of claim 9, said method further comprising:
prior to said generating the map, said processor determining, from the one or more online social network sites, an interest by the user in a picture that shows a historic site, wherein the map depicts a detour route emerging from and returning to a first travel route of the at least one travel route and depicts the historic site along the detour route.

12. The computer program product of claim 11, wherein the detour route replaces a segment of the first travel route to define a new travel route consisting of the first travel route incremented by the detour route and decremented by the replaced segment, and wherein the method further comprises:
said processor communicating to the user an estimate of a change in expected travel time in traveling the new travel route, as compared with traveling the first travel route, from the specified initial address to the specified destination address.

13. The computer program product of claim 9, wherein said determining the user preferences of the user for service providers of the specified features comprises determining a user preference of a first service provider of a first feature of the specified features, and wherein the map depicts the first feature and the first service provider distributed along each travel route the one or more travel routes.

14. The computer program product of claim 9, wherein a first and second public park are depicted on the map as appearing at a seventh and eighth location on the first and second side of the one travel route, respectively.

15. A computer system comprising:
a processor, a memory coupled to the processor;
a computer readable persistent storage device coupled to the processor; and
a user preference database specifying user preferences of users for service providers of different features, said storage device containing program code which, upon being executed by the processor via the memory, implements a method, said method comprising:

said processor ascertaining that user preferences of a user for service providers of specified features are not contained in the user preference database and that the user preferences of the user for service providers of the specified features have not been provided with a previously received request to generate for the user a geographical map that depicts one or more travel routes from a specified initial address to a specified destination address, specified features relating to the one or more travel routes, and unique identifiers of preferred service providers of the specified features;

in response to said ascertaining, said processor determining user preferences of the user for service providers of the specified features;

in response to said determining user preferences of the user for service providers of the specified features, said processor generating the map that depicts the one or more travel routes, the specified features, and the unique identifiers of the preferred service providers of the specified features, wherein the unique identifiers of the preferred service providers of the specified features are placed at locations, along the one or more travel routes, wherein a first preferred service provider of the preferred service providers is depicted on the map as appearing at a first, second, and third location on the map, wherein the first and second locations are on a first side of one travel route of the one or more travel routes, wherein the third location is on a second, opposite side of the one travel route, wherein the unique identifier of a second preferred service provider of the preferred service providers is depicted on the map as appearing at a fourth, fifth, and sixth location on the map, and wherein the fourth, fifth, and sixth locations are on the second, opposite side of the one travel route; and said processor displaying, by a display device of the computer system, the generated map.

16. The computer system of claim 15, wherein said determining the user preferences of the user for service providers of the specified features comprises:

determining, from a profile of the user in a first online social network of the one or more online social networks, a user preference of the user for the first preferred service provider of a first feature of the specified features, wherein the user is registered with the first online social network; and determining, from a profile of a member of a second online social network of the one or more online social networks, a user preference of the user for the second preferred service provider of a second feature of the specified features, wherein the member of the second online social network is associated with the user.

17. The computer system of claim 15, said method further comprising:

prior to said generating the map, said processor determining, from the one or more online social network sites, an interest by the user in a picture that shows a historic site, wherein the map depicts a detour route emerging from and returning to a first travel route of the at least one travel route and depicts the historic site along the detour route.

18. The computer system of claim 17, wherein the detour route replaces a segment of the first travel route to define a new travel route consisting of the first travel route incremented by the detour route and decremented by the replaced segment, and wherein the method further comprises:

said processor communicating to the user an estimate of a change in expected travel time in traveling the new travel route, as compared with traveling the first travel route, from the specified initial address to the specified destination address.

19. The computer system of claim 15, wherein said determining the user preferences of the user for service providers of the specified features comprises determining a user preference of a first service provider of a first feature of the specified features, and wherein the map depicts the first feature and the first service provider distributed along each travel route the one or more travel routes.

20. The computer system of claim 15, wherein a first and second public park are depicted on the map as appearing at a seventh and eighth location on the first and second side of the one travel route, respectively.

\* \* \* \* \*